US005750597A

United States Patent [19]
Waitkus

[11] Patent Number: 5,750,597
[45] Date of Patent: May 12, 1998

[54] THERMOSETTING RESIN COMPOSITIONS

[75] Inventor: Phillip A. Waitkus, Sheboygan, Wis.

[73] Assignee: Plastics Engineering Company, Sheboygan, Wis.

[21] Appl. No.: 667,271

[22] Filed: Jun. 20, 1996

[51] Int. Cl.$^6$ .................................. C08L 1/00; C08J 3/20
[52] U.S. Cl. ............................ 524/35; 524/443; 524/444; 524/445; 524/449; 524/596; 524/597
[58] Field of Search ........................ 524/35, 443, 444, 524/445, 449, 597, 596

[56] References Cited

U.S. PATENT DOCUMENTS

| | | | |
|---|---|---|---|
| 4,198,322 | 4/1980 | Storm | 264/331 |
| 4,880,893 | 11/1989 | Waitkus | 528/129 |
| 4,983,453 | 1/1991 | Beall | 428/294 |
| 5,034,497 | 7/1991 | Waitkus | 528/129 |
| 5,176,865 | 1/1993 | Beall et al. | 264/174 |
| 5,399,606 | 3/1995 | Konig et al. | 524/385 |

*Primary Examiner*—Jeffrey C. Mullis
*Attorney, Agent, or Firm*—Quarles & Brady

[57] ABSTRACT

A thermosetting resin composition which can be used to produce pultruded products with a lustrous surface finish comprises about 60% to about 95% by weight of an uncured, liquid phenolic resin containing about 70–90% solids by weight and about 5 to about 40% of particles of a molding composition comprising an uncured, solid phenolic resin and a suitable filler.

6 Claims, No Drawings

THERMOSETTING RESIN COMPOSITIONS

FIELD OF THE INVENTION

The present invention relates generally to thermosetting resins. More particularly, it relates to compositions comprising a mixture of a high solids phenolic resin and finely ground particles of a solid phenolic resin molding compound. The compositions can be used to prepare pultruded products with a lustrous surface finish.

BACKGROUND OF THE INVENTION

Thermosetting compositions, such as phenolic resins, have been known for many years and have been used in many applications because they have high heat resistance; they are lightweight; they have excellent dimensional stability and they have very low flammability. More recently, resins suitable for the production of high strength phenolic pultrusions have been described. The Waitkus U.S. Pat. No. 4,880,893 teaches the use of high solids content phenolic resins in a method for producing superior phenolic pultrusions with good surface finish and low void contents. Although the products obtained by use of the patented resins are superior to the products prepared using low solids content phenolic resins, the finished surfaces of the pultruded products are not always as lustrous or as fine as the products made by pultrusion using the more conventional polyester or epoxy addition cured resin systems.

We believe that the presence of excess water and/or the production of water or organic volatile compounds during the curing reaction is responsible for the less lustrous surface finishes obtained even when the high solids content phenolic resins are used. The effect of moisture becomes even more pronounced when low solids content resins are used. In the above mentioned patent, it is taught that the effect of this water can be controlled to a large measure by the introduction of polyglycol containing additives. It is believed that such additives act to compatiblize the water produced thereby, minimizing the microscopic bubble formation which otherwise results from the volatilization of the water. It also has been shown in a recent publication by Gauchel et al (48th Annual Conference, Society of the Plastics Industry, Feb. 8–11, 1993; Cincinnati, Ohio, Paper 2-C) that reducing the amount of water in phenolic resin systems does result in the formation of much stronger pultrusions.

As previously described, phenolic resins are known for their high temperature mechanical strength, low flammability and solvent resistance. Therefore, it would be highly desirable to be able to produce products by pultrusion using phenolic resins to produce articles having good strength and a lustrous surface finish as well.

BRIEF SUMMARY OF THE INVENTION

It is a primary object of the present invention to disclose phenolic resin compositions which can be used to produce pultruded products having good strength and lustrous surface finishes.

The novel compositions of the present invention comprise from about 60% to about 95% by weight of an uncured, high solids content liquid phenolic resin having a solids content greater than 70% by weight and about 5–40% by weight of particles of an uncured, solid phenolic resin molding compound comprising about 5% to about 75% by weight of an uncured, solid phenolic resin and about 95% to about 5% by weight of a suitable filler. The particles of the molding compound have an average size of about 1 to about 500 microns.

The high solids content liquid phenolic resin may be prepared as described in the Waitkus U.S. Pat. No. 4,880,893.

The particles of the molding compound may be prepared by preprocessing an uncured, solid phenolic resin and filler blend on heated calender rolls or passing it through a heated extruder or by compounding it by a variety of other methods known to the industry to produce a dry uncured resin containing composition of very low volatile content. The molding compound is then ground to the desired particle size and added to the high solids content liquid phenolic resin to obtain the compositions of the present invention.

Products prepared by pultrusion using the compositions of the present invention and continuous fibrous or matted or similar reinforcing materials result in high strength products having a lustrous surface finish.

DESCRIPTION OF THE PREFERRED EMBODIMENT

The preferred compositions of the present invention comprise about 60% to about 95% by weight of an uncured liquid phenolic resin having a solids content of about 70% to about 90% by weight and about 5 to about 40% by weight of particles of an uncured solid phenolic resin molding compound comprising about 5% to about 75% by weight of a phenolic resin and about 95% to about 5% by weight of a filler. The particles preferably have an average particle size of about 1 to above 500 microns.

The liquid high solids content phenolic resin component of the compositions of the present invention may be an uncured phenol formaldehyde resin resole which has a formaldehyde to phenol ratio 1.0:1 to 2:1, preferably of about 1.10:1 to 1.4:1 and which is curable to a solid crosslinked phenol-formaldehyde solid resin. The phenolic resin resole should contain less than 2.0% water. The resin resole should be one that can be liquified to a suitable viscosity by heating and which will remain at a suitable viscosity for the time required to thoroughly penetrate the reinforcement under phenolic pultrusion conditions. Suitable high solids content phenolic resin resoles are disclosed in U.S. Pat. No. 4,880,893. The formaldehyde ingredient of the preferred resin resole may be introduced into the reaction mixture as aqueous formaldehyde solution or as paraformaldehyde.

Although the preferred resin contains formaldehyde, it is well known in the art that other aldehydes such as acetaldehyde, propionic aldehyde, butylaldehyde and furfural can be substituted for formaldehyde in phenol-formaldehyde type resins.

The phenols suitable for use in the resin component are phenol per se, substituted phenols, resorcinols and mixtures thereof. Preferably the mixtures contain phenol. Suitable phenols can be represented by the formula;

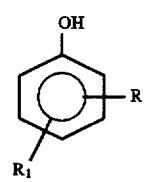

where R is hydrogen or a lower alkyl of 1 to 4 carbon atoms, such as methyl, ethyl or propyl and $R_1$ is hydrogen or OH and wherein at least one ortho- or one para-position relative to the hydroxy groups is free. Most preferably the substituents should be in the meta-positions only, leaving the ortho- and para-positions free. Examples of suitable substituted phenols are cresols, isopropylphenols, nonylphenols or dihydric phenols, such as bis-phenol A, bis-phenol F, hydroquinone, resorcinol and substituted resorcinols. Use of substituted phenols will tend to alter the properties of any resulting phenolic resin which is derived from the resulting product, such property changes being of the kind which allows for a maximum variety of phenolic resin product types. For example, a halogen substitution will enhance the flame retardancy of the resultant phenolic resin. Also a diphenol, such as bisphenol A, has an additional phenolic hydroxy group, providing another site for hydroxymethyl group or methylol group production.

The total aldehyde to total phenol molar ratio should be from about 1.0:1 to 2:1, preferably 1.1:1 to 1.4:1.

Also if desired, there may be added to the resin resole other types of polymers which can co-cure with these reactive compositions. Examples of co-reactive polymers are phenol-formaldehyde resoles, and phenol-formaldehyde novolacs of either the high ortho or nominal ortho content. The use of these additives serves either to modify the properties of the cured product or the handling characteristics of the prepolymer.

The phenolic resin of the molding compound can be any commercially available solid phenolic resin having a moisture content of less than 5%. Especially preferred are the solid novolac and resole resins sold under the tradenames Plenco 10123 and Plenco 10987 by Plastics Engineering Company of Sheboygan, Wis.

The molding compound is preferably prepared by blending the desired filler with an uncured, solid phenolic resin on a heated calender roll at a temperature which is less than the curing temperature of the resin ingredient (e.g. less than 280° F.), and then grinding the resulting dry product to an average particle size of about 1 to about 500 microns.

The fillers suitable for use in the preparation of the molding compound component of the novel compositions of the present invention include those typically used in the manufacture of reinforced composites, such as glass fibers, carbon fibers, graphite fibers, ceramic fibers, mica wollastonite, cellulosic fibers such as wood flour and the cotton fibers and the like, organic fibers such as aromatic polyamide fibers, as well as a ground, cured phenolic resin.

The preferred reinforcing materials used to make the pultruded products are glass fibers, carbon fibers, graphite fibers and aromatic polyamide fibers. In addition, certain non-fibrous additives are also useful. These are magnesium hydroxide, magnesium oxide, hydrated alumina and various calcium and magnesium carbonates and clays.

The compositions of the present invention can be used in a variety of molding processes such as prepreg compression molding or pultrusion. In the prepreg compression molding process, woven or nonwoven glass cloth is treated by conventional glass cloth impregnation techniques and B-staged to the desired molding consistency. Multiple sheets are then cut and placed in the mold and molded under heat and pressure to form highly reinforced, strong, low void containing composites.

In one modification of the pultrusion method, the reinforcing material is pulled through a bath containing the compositions of the present invention. The excess material is stripped from the surface of the reinforcement and pulled into a heated mold where the material still on the reinforcement is further liquified and flows saturating the reinforcement; the resins in the composition are then cured in situ. The finished product is pulled continuously from the mold using thus formed reinforced composite structure.

The preferred compositions of the present invention also can contain a compatibilizing agent, such as a reactive phenol derivative, which is capable of reducing the amount of acid catalyst and/or curing temperature. Resorcinol which is non-acidic and noncorrosive to molds is especially preferred. The resorcinol may be used in an amount ranging from 2% to about 30% by weight of the resin. Especially preferred is an amount of resorcinol of about 5% to 15%. Resorcinol containing novolacs and resorcinol containing resoles as described in U.S. Pat. No. 4,880,893 may be used in some instances in place of pure resorcinol. Other reactive phenol derivatives that can be employed include pyrogallol, catechol, m-aminophenol and m-cresol.

In general, although non-acidic catalysts are preferred, all those catalysts which are commonly employed for the cure of phenol-formaldehyde resins can be used to cure the novel compositions. Typical acid catalysts are sulfuric acid, sulfonic acids such as phenol-sulfonic acid, oxalic acid, boron trifluoride, boric anhydride, boric acid and mixtures or boric acid or boric anhydride with epoxies. Latent catalysts also can be used and include certain phenyl esters of carboxylic acids that form upon heating a carboxylic acid having a Pka of 2 or less and sulfur dioxide containing compounds that generate sulfur dioxide at cure conditions. Examples of latent catalysts include phenyl hydrogen maleate, phenyl trifluoroacetate and butadiene sulfone. Additional basic catalysts are the organic amines, such as hexamethylenetetramine, trimethylamine, ethanolamines and oxides and hydroxides of metals such as barium, calcium, magnesium, sodium and potassium.

The concentration of the catalyst depends on the cure rate required and the acid or the base strength of the catalyst. For a strong acid such as sulfuric acid, the typical concentration is from 0.01 weight percent to 5 weight percent. For weaker acids or bases concentrations as high as 10–15 weight percent can be employed. The latent catalysts are typically used in an amount from about 0.2 to about 10 weight percent, preferably about 0.5 to about 5 weight percent. The basis of the percentages is the weight of the catalyst free resin. Due to the ease of obtaining a homogeneous polymerizing mixture, catalysts soluble in the liquified resin of the invention are preferred.

The resins in the compositions of the present invention may be cured by the application of heat alone or in conjunction with the aforementioned catalysts. The curing temperature can be the same or lower than the temperature at which the high solids content phenolic resin component of the composition remains liquid long enough to thoroughly coat and impregnate the reinforcement fibers. Usually a curing temperature of about 100° C. to about 200° C. is employed. The curing time can be regulated by type and concentration of the catalyst and will vary depending on such factors as the particular composition of the thermosetting resin, the fabrication process, the configuration of the cured product and other factors known to those in the art.

The following examples serve to further illustrate the invention. The examples are not intended to limit the invention in any way.

EXAMPLE 1

Preparation of High Solids Content Phenolic Resin (Mole Ratio 1.266 Moles Formaldehyde/Mole of Phenol)

Into a 4 liter stainless steel resin flask, equipped with a stirrer, reflux condenser and thermometer, was charged 1500 grams (15.96 moles) USP phenol, 1170 grams (20.2 moles) 52% formaldehyde, and 120 grams of 25% tetramethylammonium hydroxide in water. The solution was stirred and heated to 90° C. over a period of 46 minutes. The batch was then held at 90° C. for 1 hour. At the end of this period, the reflux condenser was exchanged for a vacuum distillation condenser and receiver and 28" of vacuum to a batch temperature of 80° C. The distillation phase required 3 hours 15 minutes. The resin was then cooled to room temperature and discharged. Measurement of the resin's properties yielded the following results:
Yield in grams: 2055
Viscosity, Brookfield, cps, 25° C.: 7750
Specific Gravity, 25° C.: 1.184
Solids Content, 3 hrs @ 135° C.: 82.6%
Moisture Content, %: 1.58
Free Formaldehyde in the Resin, %: 1.55
Number Average Molecular Weight: 139
Weight Average Molecular Weight: 173

EXAMPLE 2

The Preparation of a Resole Resin

Into a 4 liter stainless resin kettle, equipped with an anchor agitator, reflux condenser and thermometer, was added 1500 grams (15.96 moles) phenol, 1200 grams (20.8 moles) 52% formaldehyde. To this solution was then added 7.0 grams (0.175 mole) of caustic soda and 22.9 grams (0.164 mole) of hexamethylenetetramine. This mixture was brought to 90° C. over a period of 40 minutes and maintained at this temperature for an additional 35 minutes. At the end of the holding period 26" of vacuum was slowly applied. The batch was distilled at 26" of vacuum to a temperature of 90° C., at which point the vacuum was increased slowly to 28" where it was held until the viscosity, as measured by watt meter reading on the agitator drive, reached 120 watts at a speed setting of 5. The uncured resin was then discharged to a cooling plate to cool. The yield was determined to be 1809 grams.

Measurement of the melting point of the resin, by gradient bar methods, gave a value of 170° F. and a stroke cure of 23 sec. at 330° F.

EXAMPLE 3

The Preparation of a Novolac Resin

Into a 4 liter resin kettle, equipped with a mechanical stirrer, reflux condenser and thermometer was placed:
2000 grams USP phenol
960 grams 52% formaldehyde in water solution
14 grams of oxalic acid dissolved in 30 mil. of water
This mixture was brought slowly to reflux and refluxed for one hour using a cooling bath or heating mantle to control the reflux at a steady rate. After one hour of reflux, an additional 14 grams of oxalic acid was added and the reflux continued for an additional hour. The reflux condenser was replaced with a distillation condenser and the batch distilled to a temperature of 160° C. The resulting resin was poured into a pan to cool. The light colored resin was found to weigh 2120 grams and had a gradient bar melting point of 186° F. and a set time of 330° F. when blended with hexamethylenetetramine of 26 seconds, the free phenol content of the polymer was found by gas chromatography to be approximately 6.2%. This product was then ground on a Wiley Mill to form a coarse powder with a maximum particle size such that approximately 15% was retained on a 60 mesh screen.

EXAMPLE 4

The Preparation of a Magnesium Hydroxide-Alumina Trihydrate Filled Resole Molding Compound Into the mixing chamber of a planetary mixer was placed 5000 grams of the solid resole resin of Example 2, 2500 grams of magnesium hydroxide finely ground, 2500 grams of alumina trihydrate finely ground and 100 grams of finely ground zinc stearate and 100 grams of finely ground calcium stearate. This mixture was mixed until uniform and then placed on a differential two roll mill of which the front roll mill was maintained at 240° F. and the back roll at 300° F. As soon as the sheet formed, timing was begun. The sheet was rolled an additional 30 seconds during which time it was frequently cut with the cut-off knife so that a flap of material was folded back into the rolling mix, forming a large bead at the nip of the roll. After the 30 second roll time, the cut-off knife was brought against the surface roll and the sheet stripped from the roll. The sheet was cooled, broken up and ground through a Wiley Mill equipped with a three millimeter screen. This product was further reduced in size, by passing it through a fluid energy mill, thus producing a material of face powder consistency having an average particle size of about 5 to about 500 microns so that less than 5% was retained on a 270 mesh screen. When tested for moisture content by the Karl Fisher method, it was found to contain less than 1% free moisture.

EXAMPLE 5

The Preparation of Woodflour Filled Resole Molding Compound

Example 4 was repeated except that the magnesium hydroxide and alumina trihydrate were replaced with woodflour ground to less than 100 mesh. The product so produced was reduced in size to a fine powder (about 5 to about 500 microns) on a fluid energy mill as described in Example 4.

EXAMPLE 6

The Preparation of a Novolac or Two Stage Magnesium Hydroxide-Alumina Trihydrate Filled Molding Compound Example 4 is repeated except that 5000 grams of the phenolic novolac of Example 3 was used in place of the solid resole resin. In addition, 500 grams of hexamethylenetetramine was also added.

EXAMPLE 7

Preparation of a Novolac or Two Stage Woodflour Filled Molding Compound

Example 6 was repeated except that the magnesium hydroxide and alumina trihydrate were replaced with pine woodflour ground to less than 100 mesh. This material was reduced in size to fine powder of about 5 microns to about 500 microns in size in a similar manner.

EXAMPLE 8

Comparative Tests

A standard split pultrusion rod die of a bore diameter of ½ inch and a length of 32" was charged with 32 strands of Pittsburgh Plate Glass (PPG) ECR 698/SP/4800 TEX fiber-glass having a yield of about 110 yards per pound. A dip tank was loaded with 10,000 grams of the resin of Example 1. A first zone (Zone 1) of the die was heated to 268° F., an intermediate zone (Zone 2) was heated to 290° F., a third zone (Zone 3) was heated to 341° F., and a fourth zone (Zone 4) was heated to 355° F. Of the 32 strands entering the die, only six were run through the dip tank. These six were then positioned into the center of the rod as the core material. The pull rate was set at 12" per minute and continued for one hour producing approximately 60 feet of pultruded rod. The finish on this rod using an E-9 E.D.M. surface microfinish comparitor gave a reading of 125. Next, the resin bath was replaced with 8,000 grams of the resin from Example 1 mixed with 2000 grams of the solid molding compound of Example 4. The pultrusion conditions and rate were maintained to exactly the same settings. The pultruded rod produced from the composition containing the molding compound was glossy and had a microfinish comparitor reading of less than 16 indicating the approximate order of magnitude improvement in the surface finish of the pultruded part.

EXAMPLE 9

The Preparation of Pultruded Rod Using Composition of Present Invention Containing Woodflour Filled Molding Compound Example 8 was repeated using the molding compound containing uncured solid resole containing woodflour and with the molding composition containing uncured solid novolac containing magnesium hydroxide and alumina trihydrate and woodflour. In both cases, improvement in surface finish was observed when the compositions containing the molding compounds were used, thus proving the compositions of the present invention have a desirable effect on the surface finish of the final products.

It will be readily apparent to those skilled in the art that the foregoing examples are merely illustrative of the present invention and that a number of modifications and changes may be made without departing from the spirit and scope of the invention. Therefore, it is intended that the invention only be limited by the claims.

I claim:

1. A liquid thermosetting composition for use in a pultrusion process, said composition comprising about 60 to about 95% by weight of an uncured, liquid phenolic resin containing greater than 70% solids by weight and about 5 to about 40% by weight of particles of a molding compound having an average size of about 1 to about 500 microns, said molding compound comprising a blend of an uncured, solid phenolic resin and a filler.

2. A composition of claim 1 in which the filler is selected from the group consisting of magnesium hydroxide, alumina trihydrate, calcium carbonate, clay, woodflour, wollastonite, mica, processed cellulose fiber, a pigment and mixtures thereof.

3. A composition of claim 1 in which the filler has been coated with the phenolic resin.

4. A composition of claim 1 in which the liquid phenolic resin is a phenolic novolac containing between 0 and 25% by weight of novolac curing agent.

5. A composition of claim 1 in which the solid phenolic resin is a phenolic novolac resin prepared from a substituted or an unsubstituted resorcinol or a mixture thereof.

6. A composition of claim 1 in which the liquid phenolic resin is a phenolic resole.

\* \* \* \* \*